United States Patent Office 3,467,135
Patented Sept. 16, 1969

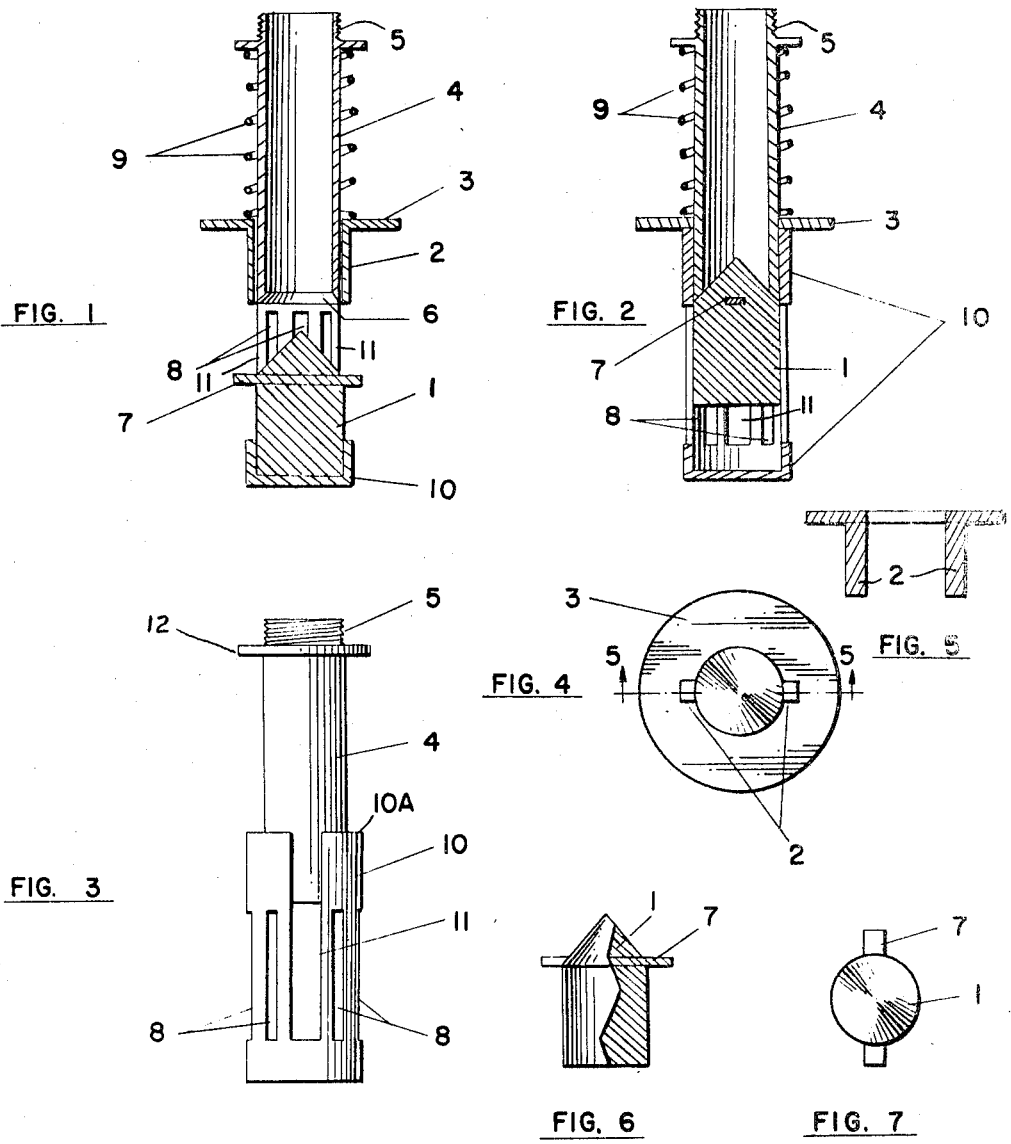

3,467,135
MAGNETIC FLOAT VALVE
Ulrich Gunther Muskalla, 1384 Chatelaine Ave.,
Ottawa 3, Ontario, Canada
Filed July 23, 1965, Ser. No. 474,380
Int. Cl. F16k 1/38, 31/08, 31/22
U.S. Cl. 137—410                                 8 Claims

ABSTRACT OF THE DISCLOSURE

A combined filling tube and magnetically-assisted float-actuated shut-off valve with manual release, used for filling a container and automatically shutting off flow at a predetermined liquid level when the device is inserted therein with a flanged magnet member resting on the container mouth, the tube having a valve seat formed in its lower end and supporting a concentric float housing tube in which a captive float is guided for axial movement, a magnetic bar passing through the float transversely, and the flange member being an axially slidable ring magnet having depending magnetic studs projecting along guide slots in the housing so that as the float rises with liquid level, magnetic attraction increases between the bar and the studs to the point the float is lifted and positively closes on and is held against the seat, shutting off flow, until the ring member is slid upward to break the magnetic hold.

---

This invention relates to an automatic valve for shutting off the flow of gravity-fed liquids.

There is a need for a small, inexpensive valve for shutting off the flow of gravity-fed liquids once a desired level has been reached. There are several methods presently available, but they all are manually operated or involve the use of complicated or expensive equipment.

This inveniton makes it possible to automatically shut off the flow of gravity-fed liquids with a combination float-valve. A bar-magnet is inserted in the float, which will be attracted by a ring-magnet with magnetic studs situated in the cut-away portion of the float retainer housing, after the float is buoyant, and magnetic force is utilized to shut and to hold the valve closed.

In drawings which illustrate embodiments of the invention,

FIGURE 1 is a cross-section of complete valve in the open position.

FIGURE 2 is a cross-section of complete valve in the closed position, at right-angles to FIGURE 1.

FIGURE 3 is a cross-section of the valve container.

FIGURE 4 is a top view of the ring-magnet with magnetic studs.

FIGURE 5 is a cross-section of the ring-magnet with studs.

FIGURE 6 is a cross-section of the float complete with the bar-magnet attachment.

FIGURE 7 is a top view of the float with the poles of the bar-magnet showing.

In the drawings, the numeral 4 designates a feeder pipe 4 of which there are two permanent parts, a stopper nut 12 with outside thread 5 at the mouth of the feeder pipe 4 and a feeder-pipe seat 6 at the bottom, which is the upper limits of the float 1.

A bar-magnet 7 is inserted in the float 1 with the magnetic poles in opposite polarity to the magnetic studs 2 for better action. The float 1 is inserted into the float retainer housing 10 with the bar-magnet 7 fitted into the guide slots 11. Then the float retainer housing 10 is permanently attached to the feeder pipe 4.

With this arrangement, a liquid can be poured into the mouth of the feeder pipe 4, flow down this pipe and out of the valve into a container through the outlet slots 8 and the guide slots 11.

A ring-magnet 3 with magnetic studs 2 is fitted over the feeder pipe 4 into the guide slots 11 of the float retainer housing 10. The ring-magnet 3 is held in the operating position by the upper rim of the float retainer housing 10 and by the coil-spring 9. This coil-spring 9 is held in place by a stopper nut 12 screwed on the permanently attached thread 5 on the feeder pipe 4.

The operation is as follows; in FIGURE 1, the valve is shown open ready to accept a liquid. The liquid is poured down the feeder pipe 4 out through the outlet slots 8 and guide slots 11 into a container. When the liquid reaches the desired level, the float will become buoyant and will pop shut. Without this invention, the weight of the liquid will force the float down opening the valve and hence introduce an excess of the liquid causing an overflow.

With the ring-magnet 3 and bar-magnet 7 so arranged, when the liquid reaches the desired level, the float will pop up, but it then comes into the influence of the strong magnetic field and will close with a snap action. The force of the magnetic field will be of sufficient strength to keep the valve closed as viewed in FIGURE 2.

The release of the valve is accomplished as follows; when the valve has snapped shut, the source of the liquid is removed from the feeder pipe 4 and the ring-magnet 3 is then manually lifted thereby breaking the magnetic field between the ring-magnet 3 and the bar-magnet 7 and the float 1 will fall by nature to the bottom of the float retainer housing 10, and the valve will be cleared of the liquid. The coil-spring 9 will return the ring-magnet 3 making the valve ready for the next operation.

This valve with the exception of the spring 9 and the stopper nut 12 and the magnets 2, 3, and 7 must be made of a non-magnetic material such as aluminum, brass, copper, plastic, etc.

This invention is designed for the use of the various tradesmen, in homeworkshops, light industry and wherever the requirement is for filling containers or tanks with dangerous or explosive liquids such as camping stoves, gasoline tanks, acid containers, wherean overflow will be dangerous.

This valve can be threaded to funnels, spouts, or feeder hoses.

The embodiments of the invention in which an exclusive property or privilege is claimed are defined as follows:

1. A magnetically-assisted float-actuated valve having an upright conduit having a cylindrical bore for conveying fluid and having an upper fluid inlet and a lower discharge end formed as a valve seat, a movable buoyant float element disposed below said seat having a seating face engageable with said seat to close said valve, a fluid-pervious float housing surrounding said float permitting guided movement of said float axially of said conduit, a magnetic member, a support for said magnetic member carried externally of said conduit, and a magnetically attractable bar carried by said float and disposed so that when said float is moved within a predetermined distance below said seat said bar will be within the lifting range of said magnetic member to effect engagement of said seating face on said seat.

2. A valve as set forth in claim 1 wherein said float has a conic seating face and said valve seat is conically bevelled and said float housing is tubular and concentric with said conduit, an end of said housing adjacent said valve seat being formed as an external shoulder along said conduit defining a lower limit position for said magnetic member.

3. A valve as set forth in claim 2 wherein said float housing is longitudinally slotted and ends of said bar project into and are guidedly received in respective diametrically opposed guide slots serving also as egress apertures for fluid.

4. A valve as set forth in claim 3 wherein said magnetic member comprises a ring magnet having a bore coaxial with said conduit and magnetic studs fixed on said member and depending therefrom at opposed marginal locations of said bore and projecting along said guide slots toward the ends of said bar.

5. A valve as set forth in claim 4 wherein said magnetic member is slidable along said conduit to vary the axial position along said guide slots of the ends of said studs.

6. A valve as set forth in claim 5 wherein the polarities of an end of said bar and the end of a stud occupying the same guide slot are such that these parts are mutually attractive.

7. A valve as set forth in claim 6 wherein said conduit has an externally threaded inlet end and a stop nut threadedly engaged on said threaded end, and a coil spring is compressed between said stop nut and said ring magnet to hold said ring magnet on said shoulder.

8. A valve as set forth in claim 7 wherein said ring magnet projects radially from said float housing to provide a flange for seating of said valve on the mouth of a container.

References Cited

UNITED STATES PATENTS

| | | | |
|---|---|---|---|
| 493,994 | 3/1893 | Gaudron | 141—199 X |
| 3,233,625 | 2/1966 | Pase | 137—416 |

WILLIAM F. O'DEA, Primary Examiner

DAVID R. MATTHEWS, Assistant Examiner

U.S. Cl. X.R.

73—322.5; 137—416, 429, 433; 251—65